Aug. 25, 1959  C. W. COCHRAN  2,900,687
FASTENING DEVICE
Filed April 19, 1957
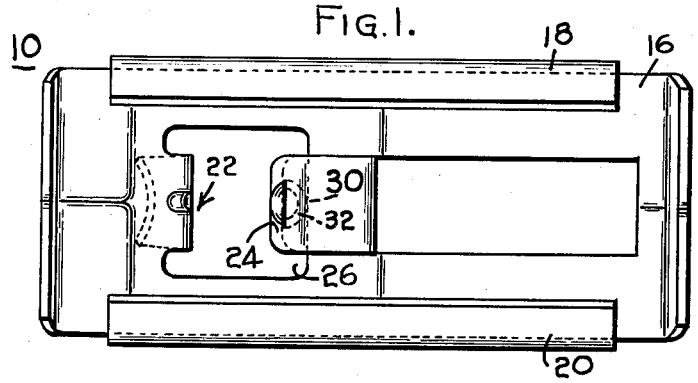
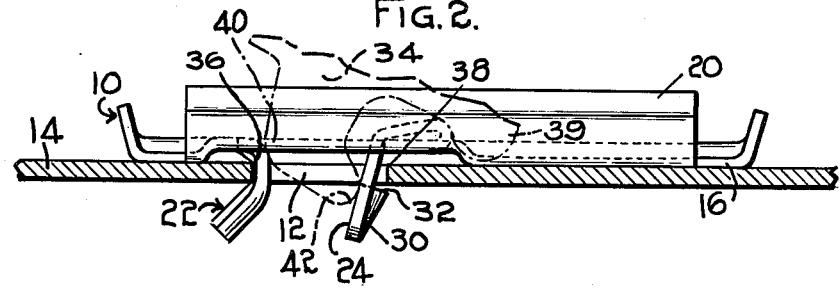
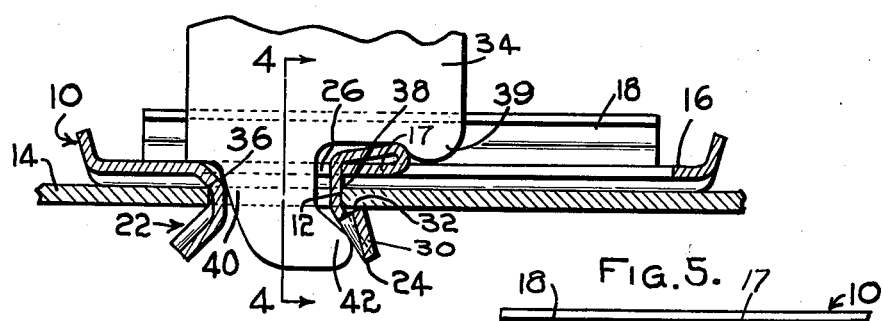
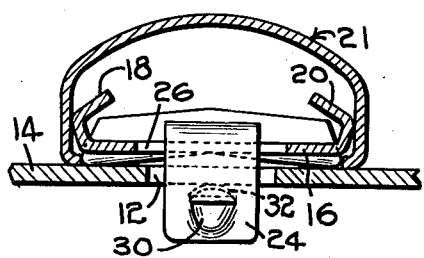
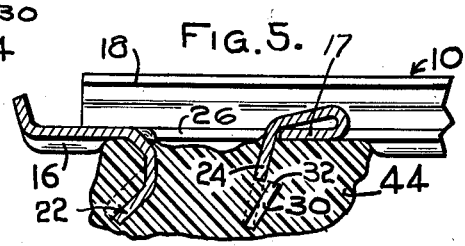
INVENTOR:
CLARENCE W. COCHRAN,
BY Walter P. Jones
ATTORNEY.

United States Patent Office 2,900,687
Patented Aug. 25, 1959

2,900,687
FASTENING DEVICE

Clarence W. Cochran, Belmont, Mass., assignor to United-Carr Fastener Corporation, Boston, Mass., a corporation of Delaware Application April 19, 1957, Serial No. 653,819

2 Claims. (Cl. 24—73)

This invention relates generally to fastening devices and has particular reference to a fastener for attaching a trim molding or the like to a panel.

In the construction of automobile appliances and the like, molding is required to be attached to the exterior surface of certain panels and in many cases it is essential that the molding be assembled into a blind opening.

The object of this invention is to provide a fastening device for attaching an article to a panel which has improved means for engaging the panel opening.

Another object of the invention is to provide a molding fastener having collateral arms struck out of the main body of the fastener, one arm being deformable outwardly and having means thereon limiting the point of deformation.

Other objects of the invention will, in part, be obvious, and will, in part, appear hereinafter.

In drawing:

Fig. 1 is a plan view of the fastener.

Fig. 2 is a view in elevation with the apertured plate in section, showing the deforming tool in position before locking the fastener arm.

Fig. 3 is a longitudinal section of the fastener shown in Fig. 2 with the locking tool in position after deforming the arm.

Fig. 4 is a section on line 4—4 of Fig. 3 with the molding attached thereto.

Fig. 5 is a view of the fastener in section showing the attaching means enclosed in a resilent plastic waterproof material.

Referring to the drawing, there is illustrated a fastening device 10 which is adapted for assembly into an aperture 12 in a panel 14 to enable a trim molding or the like to be attached thereto.

The fastener 10 comprises a base 16 having means such as flanges 18 and 20 at opposite edges for receiving a conventional hollow molding 21 to secure it to the supporting panel 14, hook means adapted to engage one edge of the wall surrounding a panel aperture 12 and a deformable leg 24 extending downward through a central opening 26.

In the preferred embodiment the hook means 22 is struck from the material of the base 16 projecting downwardly and being bent back upon itself so as to be angularly disposed to the under surface of the base 16. The leg 24 is formed by bending a medial portion 17 of the base 16 upwardly and back upon itself and extending downwardly through the opening 26 in the body portion 16 from which the hook means 22 was formed. The leg 24 is provided with a lateral outstanding flange 30 having a free end portion 32 adapted to lock into engagement with the under surface of the panel 14 when it is acted upon by a suitable tool 34.

In securing the fastener member to the supporting panel 14, the hook means 22 is inserted through the panel aperture 12 for engaging a wall 36 at the aperture 12, with leg 24 extending through the aperture 12 adjacent to an opposite wall 38 (Fig. 2). A suitable tool is inserted through the opening 26 in the base 16 in such a manner that one portion of the tool 39 pivots on the upper surface of the base 16 and another portion 40 maintains sliding contact with the hook 22 resulting in a curved portion 42 of the tool forcing the deformable leg 24 into a locking position with the panel 14 and the free end 32 of the flange 30 abutting the under surface of the panel for locking engagement therewith as shown in Fig. 3.

In the preferred form as shown in Fig. 5, the fastener 10 has the attaching hook means 22 and the deformable arm 24 completely enclosed in a resilient plastic material 44 to prevent the ingress of water into the supporting structure.

It will be thus seen that the fastener described herein can be constructed from a single piece of sheet metal having attaching means struck out from within the periphery of the body of the fastener and requires only a simple tool to effect a secure locking attachment.

Since certain other obvious modifications may be made in the device without departing from the scope of the invention, it is intended that all matters contained herein be interpreted in an illustrative and not in a limiting sense.

I claim:

1. A fastening device for attaching an article to an apertured support comprising a base portion, a pair of spaced arms extending downwardly therefrom, said arms being struck out of said base portion within its periphery and providing two openings therein separated by a median strip of material, one of said arms bent arcuately away from one of said openings and providing hook means for engagement with the apertured support at one edge of the aperture therein, a second arm integral with said median strip whose terminal end passes through the opening created by the forming of the arm with the hook means and adapted to be deformed laterally providing cooperating locking means with said first arm to engage and lock with the support at the opposite edge of the aperture therein.

2. A fastening device for attaching an article to an apertured support comprising a base, a pair of spaced arms extending downwardly therefrom, said arms being struck out of said base portion within its periphery and providing two openings therein separated by a median strip of material, the first of said arms sharply bent providing hook means for engaging one wall surrounding the aperture in the support panel, the other arm integral with said median strip, bent back in substantially parallel spaced relationship with the plane of the said median strip, the terminal end of said arm passing through the opening created by the forming of the said first arm and adapted to be deformed laterally by a suitable tool to engage the opposite wall at the aperture in the support panel.

References Cited in the file of this patent
UNITED STATES PATENTS

| | | |
|---|---|---|
| 2,265,957 | Tinnerman | Dec. 9, 1941 |
| 2,476,207 | Brown | July 12, 1949 |
| 2,653,687 | Churchill | Sept. 29, 1953 |
| 2,779,986 | Bylski | Feb. 5, 1957 |